(12) United States Patent
Ogura

(10) Patent No.: US 9,820,210 B2
(45) Date of Patent: Nov. 14, 2017

(54) BASE STATION, COMMUNICATION SYSTEM, AND CONTROL METHOD FOR BASE STATION

(71) Applicant: Daisuke Ogura, Tokyo (JP)

(72) Inventor: Daisuke Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 40 days.

(21) Appl. No.: 14/358,360

(22) PCT Filed: Oct. 3, 2012

(86) PCT No.: PCT/JP2012/006364
§ 371 (c)(1),
(2) Date: May 15, 2014

(87) PCT Pub. No.: WO2013/094092
PCT Pub. Date: Jun. 27, 2013

(65) Prior Publication Data
US 2014/0293772 A1    Oct. 2, 2014

(30) Foreign Application Priority Data

Dec. 22, 2011   (JP) ................................ 2011-280805

(51) Int. Cl.
*H04W 24/04* (2009.01)
*H04W 40/14* (2009.01)
*H04W 16/08* (2009.01)
*H04W 16/26* (2009.01)

(52) U.S. Cl.
CPC ........... *H04W 40/14* (2013.01); *H04W 24/04* (2013.01); *H04W 16/08* (2013.01); *H04W 16/26* (2013.01)

(58) Field of Classification Search
None
See application file for complete search history.

(56) References Cited

U.S. PATENT DOCUMENTS 5,852,778 A * 12/1998 Labedz .................. 455/423
6,944,454 B1 * 9/2005 Lee et al. ............... 455/443
(Continued)

FOREIGN PATENT DOCUMENTS

CN      101155065 A      4/2008
JP      2011-44776 A     3/2011
(Continued)

OTHER PUBLICATIONS

Extended European Search Report dated Jul. 16, 2015.
(Continued)

*Primary Examiner* — Chi H Pham
*Assistant Examiner* — Shick Hom
(74) *Attorney, Agent, or Firm* — McGinn IP Law Group, PLLC

(57) ABSTRACT

In order to more quickly detect a failure in a radio base station and complement the coverage thereof, a first base station included in a communication system forms a first cell to conduct radio communication with one or more mobile stations. A second base station, which is placed adjacent to the first base station, forms a second cell to conduct radio communication with one or more mobile stations. The first base station conducts communication with the second base station to monitor whether or not a failure occurs in the second base station. When it is detected as a result of the monitoring that the failure occurs in the second base station, the first base station expands coverage of the first cell so as to complement that of the second cell.

4 Claims, 4 Drawing Sheets

(56) References Cited

U.S. PATENT DOCUMENTS

| | | | |
|---|---|---|---|
| 8,520,591 B2* | 8/2013 | Iimori | H04W 36/0022 370/328 |
| 2007/0281683 A1* | 12/2007 | Goulet | H04W 24/04 455/423 |
| 2011/0130137 A1 | 6/2011 | Sanders et al. | |
| 2011/0287771 A1 | 11/2011 | Oyama | |
| 2011/0294508 A1* | 12/2011 | Min | H04W 36/0083 455/436 |
| 2012/0178483 A1* | 7/2012 | Rosenau | 455/509 |
| 2012/0208543 A1* | 8/2012 | Takagi | 455/446 |
| 2013/0005390 A1 | 1/2013 | Oyama | |
| 2013/0148502 A1* | 6/2013 | Yang | H04L 43/0811 370/235 |
| 2013/0217382 A1* | 8/2013 | Kudo | H04W 24/04 455/423 |

FOREIGN PATENT DOCUMENTS

| | | |
|---|---|---|
| JP | 2011-244389 A | 12/2011 |
| WO | WO 2008/050388 A1 | 5/2008 |
| WO | WO 2009/106138 A1 | 9/2009 |
| WO | WO 2011/114430 A1 | 9/2011 |

OTHER PUBLICATIONS

International Search Report (ISR) (PCT Form PCT/ISA/210), in PCT/JP2012/006364, dated Nov. 6, 2012.
Chinese Office Action dated Mar. 3, 2017 with an English translation thereof.

* cited by examiner

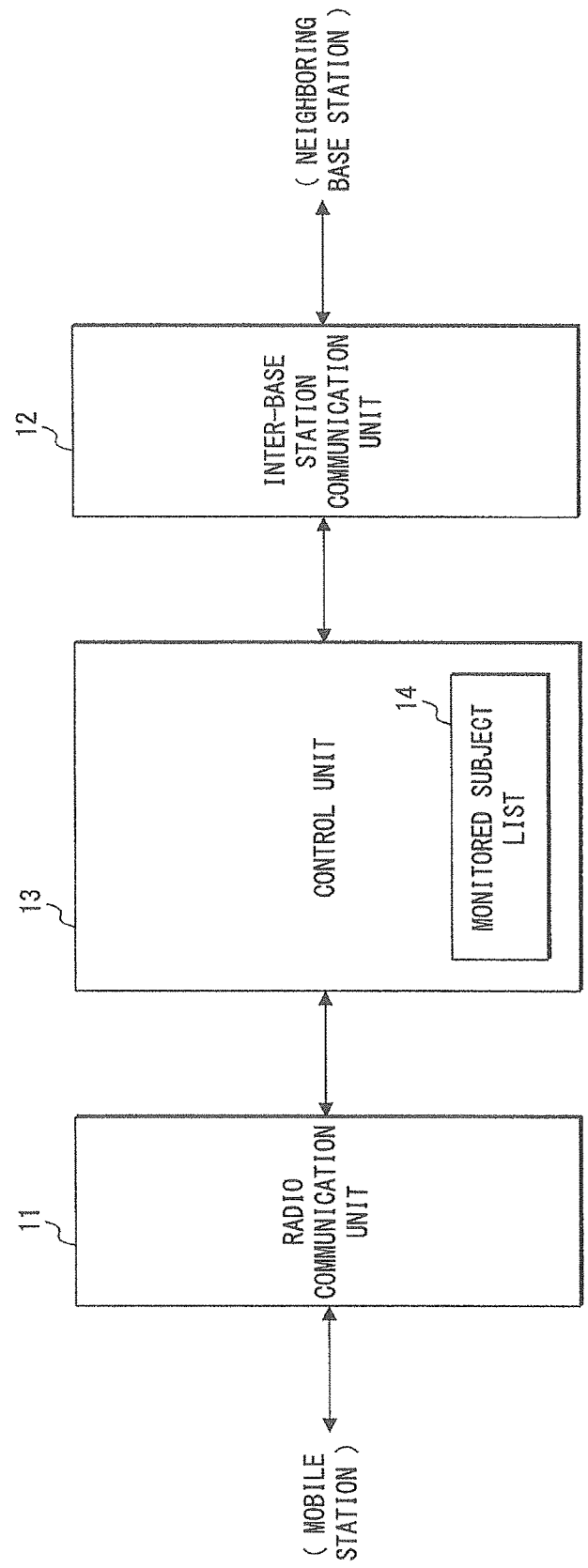

BASE STATION, COMMUNICATION SYSTEM, AND CONTROL METHOD FOR BASE STATION

TECHNICAL FIELD

The present invention relates to a base station, a communication system and a control method for the base station, and particularly to a technique to monitor a failure occurring in the base station.

BACKGROUND ART

3GPP (3rd Generation Partnership Project) has defined only a function of monitoring failures at an application layer. However, there is a problem with this function that failures in a device itself cannot be detected. Moreover, another problem is caused regarding the continuity of communication services for users, because it takes a long time for the monitoring at the application layer to detect failures.

PTL 1, for example, discloses a technique for addressing these problems. A network monitoring device disclosed in PTL 1 is connected to a plurality of radio base stations through an RNC (Radio Network Controller) or a GW (Gateway), and monitors failures occurring in the respective radio base stations. This network monitoring device detect a failure occurring in a certain radio base station, and then causes a neighboring radio base station to complement coverage (range within which radio communication can be conducted) of the radio base station in the failure state.

CITATION LIST

Patent Literature

PTL 1: International Patent Publication No. WO2008/050388

SUMMARY OF INVENTION

Technical Problem

However, the inventor of this application has found that there is a problem in the above PTL 1 that it is not possible adequately shorten the time required for detecting the failure, thereby harming the continuity of communication services. This is because the network monitoring device intensively monitors failures in the plurality of radio base stations.

Accordingly, an exemplary object of the present invention is to more quickly detect a failure in a radio base station and complement the coverage thereof.

Solution to Problem

In order to achieve the above-mentioned object, a base station according to a first exemplary aspect of the present invention includes: first communication means for forming a cell to conduct radio communication with one or more mobile stations; second communication means for conducting communication with a neighboring base station placed adjacent to the radio base station to monitor whether or not a failure occurs in the neighboring base station; and control means for controlling the first and second communication means. The control means is configured to cause, when it is detected as a result of the monitoring that the failure occurs in the neighboring base station, the first communication means to expand coverage of the cell so as to complement coverage of a neighboring cell formed by the neighboring base station.

Further, a communication system according to a second exemplary aspect of the present invention includes: a first base station that forms a first cell to conduct radio communication with one or more mobile stations; and a second base station that is placed adjacent to the first base station and forms a second cell to conduct radio communication with one or more mobile stations. The first base station is configured to: conduct communication with the second base station to monitor whether or not a failure occurs in the second base station; and expand coverage of the first cell so as to complement coverage of the second cell when it is detected as a result of the monitoring that the failure occurs in the second base station.

Furthermore, a control method according to a third aspect of the present invention provides a method of controlling a base station that forms a cell to conduct radio communication with one or more mobile stations. This control method includes: conducting communication with a neighboring base station placed adjacent to the base station to monitor whether or not a failure occurs in the neighboring base station; and expanding coverage of the cell so as to complement coverage of a neighboring cell formed by the neighboring base station when it is detected as a result of the monitoring that the failure occurs in the neighboring base station.

Advantageous Effects of Invention

According to the present invention, it is possible to more quickly detect a failure in a radio base station and complement the coverage thereof.

BRIEF DESCRIPTION OF DRAWINGS

FIG. 3 is a block diagram showing a configuration example of the base station according to the exemplary embodiment of the present invention;

DESCRIPTION OF EMBODIMENTS

Figure 1:
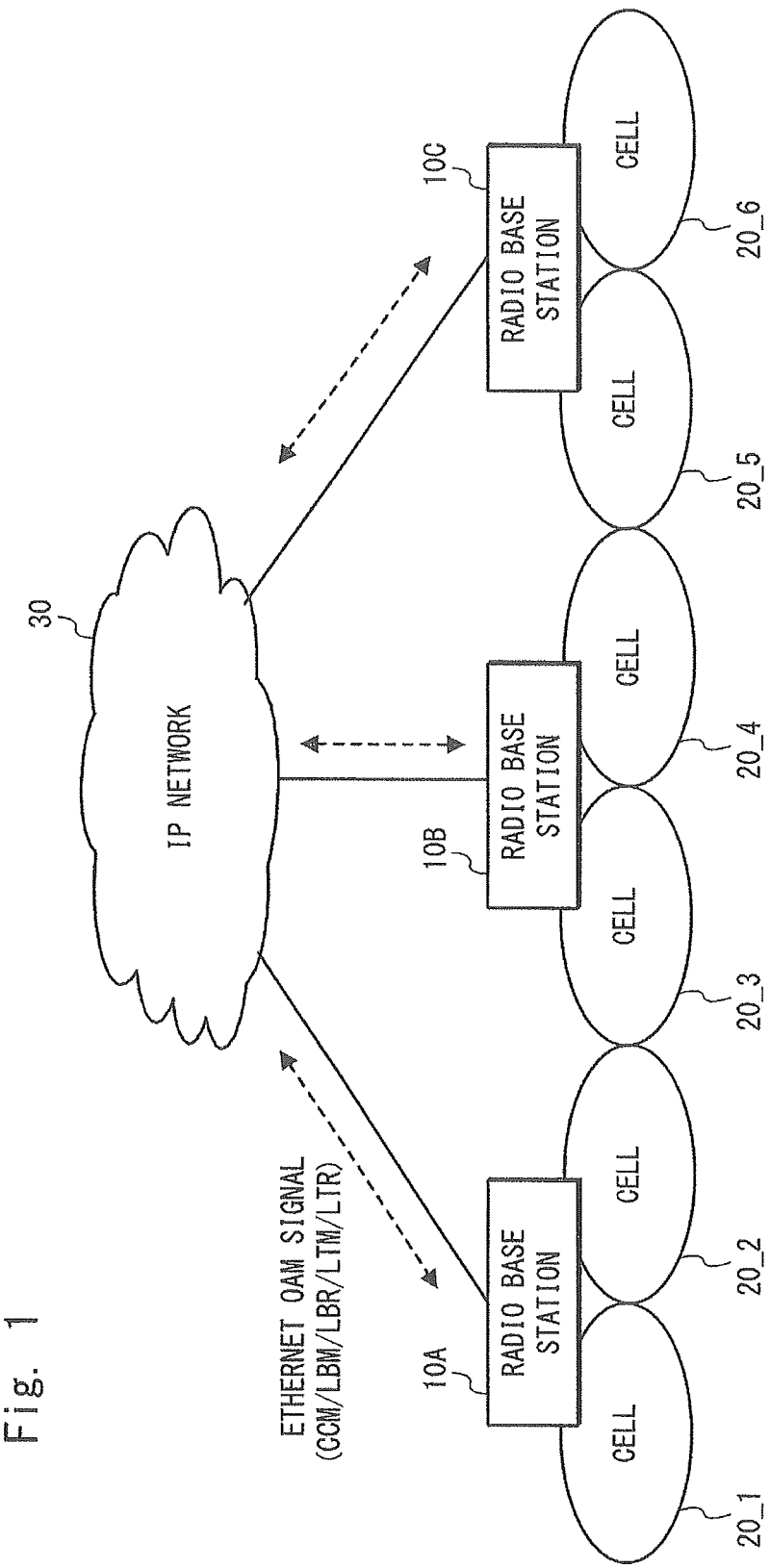
FIG. 1 is a block diagram showing a configuration example of a communication system to which a base station according to an exemplary embodiment of the present invention is applied.

Hereinafter, an exemplary embodiment of a base station according to the present invention and a communication system to which this base station is applied will be described with reference to FIGS. 1 to 3 and 4A to 4C. Note that in the drawings, identical reference symbols denote identical elements and redundant explanation thereof will be omitted as appropriate to clarify the explanation.

As shown in FIG. 1, a communication system 1 according to this exemplary embodiment includes, as one example, three radio base stations 10A to 10C placed adjacent to each other (hereinafter, they may be collectively referred to by a code 10).

The radio base station 10A forms cells 20_1 and 20_2 to conduct radio communication with one or more mobile stations (not shown). Similarly, the radio base station 10B forms cells 20_2 and 20_3, and the radio base station 10C forms cells 20_5 and 20_6. The cells 20_1 to 20_6 have mutually different coverage. Note that although the illustrated example deals with a case where each of the radio base stations 10A to 10C forms sector cells (a plurality of cells whose directionalities are different from each other), each radio base station may form an omni-cell (single cell in which radio waves are transmitted in all directions). In the latter case, the following description can be similarly applied.

Moreover, the radio base stations 10A to 10C are connected to each other so as to be able to communicate with each other, through an IP (Internet Protocol) network as an example of backhauls. In this case, it is preferable that as shown by dotted lines in FIG. 1, various signals defined in Ethernet (registered trademark) OAM (Operations, Administration, Maintenance) (hereinafter, these signals may be referred to as "Ethernet OAM signals") be used for communication between the radio base stations 10A to 10C (hereinafter, this communication may be referred to as "inter-base station communication").

The Ethernet OAM is a function for enabling a failure in IP network equipment to be detected at an Ethernet layer, and the standardization thereof has been facilitated as IEEE 802.1ag, Y.1731 or the like. In this exemplary embodiment, the specific failure point is detected by utilizing the function of Ethernet OAM.

Examples of the Ethernet OAM signals include CCM (continuity check Message), LBM (Loop Back Message), LBR (Loop Back Reply), LTM (Link Trace Message), LTR (Link Trace Reply) and the like.

Next, an operation example of the communication system 1 will be described with reference to FIG. 2.

Figure 2:
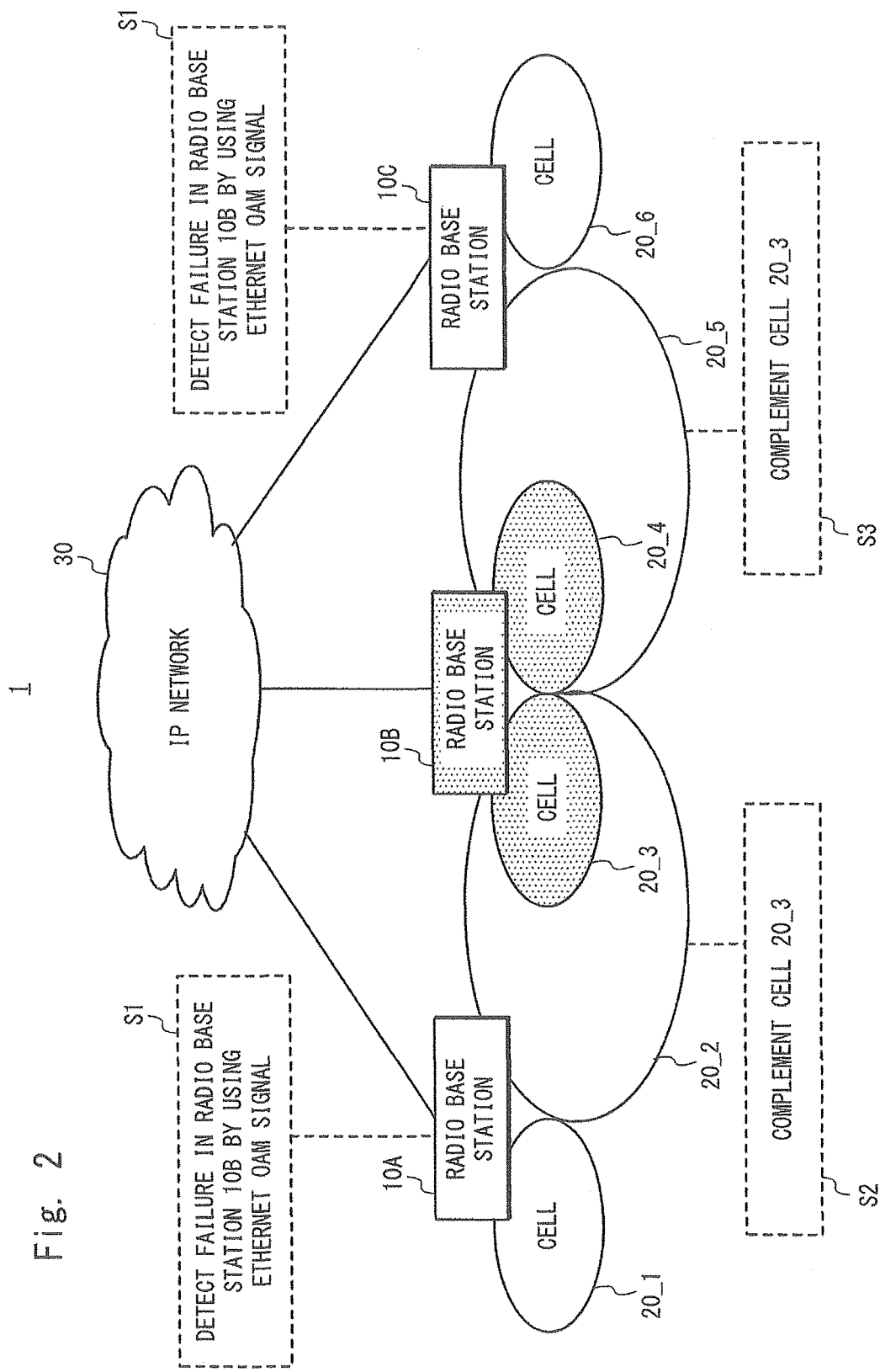
FIG. 2 is a block diagram showing an operation example of the communication system to which the base station according to the exemplary embodiment of the present invention is applied.

Assume that as indicated by shaded portions in FIG. 2, a failure occurs in the radio base station 10B, or upper network equipment (not shown) higher than the radio base station 10B.

In this case, the radio base stations 10A and 10C respectively detect the failure in the radio base station 10B or the upper network equipment by using the Ethernet OAM signal (step S1).

More specifically, taking as an example a case where the CCM is used as the Ethernet OAM signal, the radio base stations 10A and 10C periodically receives a CCM frame from the radio base station 10B. If the failure occurs in the radio base station 10B or the upper network equipment, the CCM frame could not be received at the radio base stations 10A and 10C. Therefore, the radio base stations 10A and 10C determine that the failure occurs in the radio base station 10B or the upper network equipment.

Further, taking as an example a case where the LBM and the LBM are used as the Ethernet OAM signals, the radio base stations 10A and 10C transmit LBM frames to the radio base station 10B. If the radio base station 10B and the upper network equipment operate normally, the radio base station 10B receives the LBM frames, and transmits to the radio base stations 10A and 10C LBR frames in response to receiving the LBM frames. Each of the radio base stations 10A and 10C receives the LBR frame, and then determines that the radio base station 10B and the upper network equipment operate normally. Meanwhile, when the failure occurs in the radio base station 10B or the upper network equipment, the LBR frames are not transmitted from the radio base station 10B or are intercepted at the upper network equipment, so that the LBR frames cannot reach the radio base stations 10A and 10C. Therefore, the radio base stations 10A and 10C determine that the failure occurs in the radio base station 10B or the upper network equipment.

Furthermore, taking as an example a case where the LTM and the LTR are used as the Ethernet OAM signals, the radio base stations 10A and 10C transmit LTM frames to the radio base station 10B. If the upper network equipment operates normally, the upper network equipment transmits to the radio base stations 10A and 10C LTR frames in response to transferring the LTM frames to the radio base station 10B. Each of the radio base stations 10A and 10C receives the LTR frame from the upper network equipment, and then determines that the upper network equipment operates normally. Moreover, if the radio base station 10B operates normally, the radio base station 10B transmits to the radio base stations 10A and 10C LTR frames in response to receiving the LTM frames. Each of the radio base stations 10A and 10C receives the LTR frame from the radio base station 10B, and then determines that the radio base station 10B operates normally. Meanwhile, when the failure occurs in the upper network equipment, the LTR frames from the upper network equipment cannot reach the radio base stations 10A and 10C. Therefore, the radio base stations 10A and 10C determine that the failure occurs in the upper network equipment. Moreover, when the failure occurs in the radio base station 10B, the LTR frames from the radio base station 10B cannot reach the radio base stations 10A and 10C. Therefore, the radio base stations 10A and 10C determine that the failure occurs in the radio base station 10B.

Then, the radio base station 10A expands coverage of the cell 20_2, thereby complementing coverage of the cell 20_3 (step S2). Similarly, the radio base station 10B expands coverage of the cell 20_5, thereby complementing coverage of the cell 20_4 (step S3).

As described above, in this exemplary embodiment, base stations each detect a failure in a neighboring base station, and autonomously complement coverage of a neighboring cell. Therefore, it is possible to greatly shorten the time required for detecting the failure and complementing the coverage, compared with the case of the above PTL 1.

Further, mobile stations, which have been connected to the base station falling into the failure (the radio base station 10B in the example shown in FIG. 2), are immediately handed over to the neighboring cell having the expanded coverage (the cell 20_2 or 20_5 in the example shown in FIG. 2), so that the mobile stations can continuously receive communication services. In other words, according to this exemplary embodiment, it is possible to minimize the impact on communication services due to the failure, and thus to ensure the continuity of communication services for users.

Furthermore, there are also merits that the Ethernet OAM signal is used for the inter-base station communication and thus the failure detection can be performed more quickly than in the case where the failure detection is performed at an upper layer like the application layer, and that the failure point can be specifically identified.

Hereinafter, a concrete specific configuration example and a concrete operation example of the radio base station effectuating the above-mentioned operations will be described in detail with reference to FIGS. 3 and 4A to 4C.

As shown in FIG. 3, the radio base station 10 according to this exemplary embodiment includes a radio communication unit 11, an inter-base station communication unit 12, and a control unit 13 which controls these communication units 11 and 12.

Among these units, the radio communication unit 11 forms a cell in compliance with various radio communication methods applied to the communication system 1 in a manner similar to a radio transceiver or the like mounted on a typical radio base station, thereby conducting radio communication with mobile stations. Moreover, the inter-base station communication unit 12 conducts inter-base station communication with a neighboring base station by using e.g., the above-mentioned Ethernet OAM signal, thereby monitoring whether or not a failure occurs in the neighboring base station or its upper network equipment.

On the other hand, the control unit 13 controls the radio communication unit 11 to complement coverage of a neighboring cell, when the failure is detected by the inter-base station communication unit 12.

Preferably, the control unit 13 holds therein a monitored subject list 14, and controls the communication units 11 and 12 based on this list 14. In the monitored subject list 14, information on neighboring base stations to be monitored by the inter-base station communication unit 12 (for example, information on identifiers, addresses used for the inter-base station communication, and the like) is stored in association with information on coverage of neighboring cells (for example, information on the size and directionality of coverage, and the like).

Figure 4A:
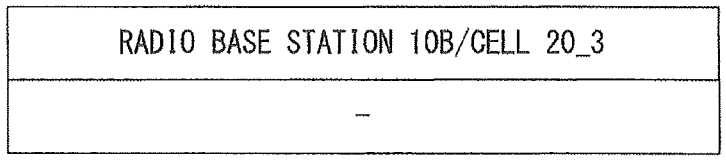
FIG. 4A is a diagram showing a first setup example of a monitored subject list used for the base station according to the exemplary embodiment of the present invention.
Figure 4B:
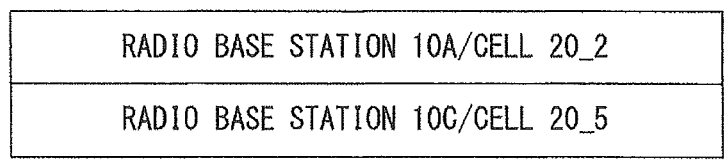
FIG. 4B is a diagram showing a second setup example of the monitored subject list used for the base station according to the exemplary embodiment of the present invention.
Figure 4C:
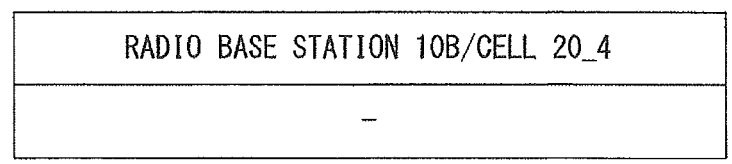
FIG. 4C is a diagram showing a third setup example of the monitored subject list used for the base station according to the exemplary embodiment of the present invention.

FIGS. 4A to 4C show setup examples of monitored subject lists 14A to 14C respectively held by the above-mentioned radio base stations 10A to 10C. As shown in FIG. 4A, in the monitored subject list 14A, information on the radio base station 10B is stored in association with information on the coverage of the cell 20_3. As shown in FIG. 4B, in the monitored subject list 14B, information on the radio base stations 10A and 10C is stored in association with information on the coverage of the cells 20_2 and 20_5. As shown in FIG. 4C, in the monitored subject list 14C, information on the radio base station 10B is stored in association with information on the coverage of the cell 20_4.

In operations, taking as an example a case where a failure occurs in the radio base station 10B as in the case shown in FIG. 2, the control unit 13 in the radio base station 10A retrieves the monitored subject list 14A to identify the information on the coverage of the cell 20_3 corresponding to the radio base station 10B. Then, the control unit 13 determines a parameter for expanding the cell 20_2 based on the identified information. For example, the control unit 13 determines, as this parameter, transmission power of the cell 20_2 necessary for complementing the coverage of the cell 20_3, and instructs the radio communication unit 11 about the determined transmission power. In response to the instruction, the radio communication unit 11 increases the transmission power of the cell 20_2. Similarly, the control unit 13 in the radio base station 10C retrieves the monitored subject list 14C to identify the information on the coverage of the cell 20_4 corresponding to the radio base station 10B, and determines a parameter for expanding the cell 20_5 based on the identified information. Thus, transmission power of the cell 20_5 is increased, so that the coverage of the cell 20_5 is expanded so as to complement the coverage of the cell 20_4.

As described above, according to the simple configuration using the monitored subject list, it is possible to shorten the processing time required from when the failure is detected till when the coverage complementation is accomplished, so that the impact on communication services can be further reduced.

Note that the present invention is not limited to the above-mentioned exemplary embodiments, and it will be understood by those of ordinary skill in the art that various changes in form and details may be made therein without departing from the spirit and scope of the present invention as defined by the claims.

This application is based upon and claims the benefit of priority from Japanese patent application No. 2011-280805, filed on Dec. 22, 2011, the disclosure of which is incorporated herein in its entirety by reference.

INDUSTRIAL APPLICABILITY

The present invention is applied to a base station, a communication system and a control method for the base station. In particular, the present invention is applied for the purpose of monitoring a failure occurring in the base station.

REFERENCE SIGNS LIST

1 COMMUNICATION SYSTEM
10, 10A-10C RADIO BASE STATION
11 RADIO COMMUNICATION UNIT
12 INTER-BASE STATION COMMUNICATION UNIT
13 CONTROL UNIT
14, 14A-14C MONITORED SUBJECT LIST
20_1-20_6 CELL
30 IP NETWORK

The invention claimed is:

1. A base station comprising:
a first communication unit that forms a cell to conduct radio communication with one or more mobile stations;
a second communication unit that conducts communication with a neighboring base station placed adjacent to the base station to monitor whether or not a failure occurs in the neighboring base station; and
a control unit that controls the first and second communication units,
wherein the control unit is configured to cause, when it is detected as a result of the monitoring that the failure occurs in the neighboring base station, the first communication unit to expand coverage of the cell so as to complement coverage of a neighboring cell formed by the neighboring base station,
wherein the control unit is configured to:
store information on each of one or more neighboring base stations to be monitored by the second communication unit, in association with information on coverage of each of neighboring cells formed by the each of one or more neighboring base stations;
identify, when it is detected by the second communication unit that the failure occurs in one neighboring base station, information on coverage of one neighboring cell corresponding to said one neighboring base station; and
determine a parameter for expanding the coverage of the cell based on the identified information.

2. The base station according to claim 1, wherein the second communication unit is configured to conduct the communication with the neighboring base station, by use of a signal defined in Ethernet OAM (Operations, Administration, Maintenance).

3. A method of controlling a base station that forms a cell to conduct radio communication with one or more mobile stations, the method comprising:
- conducting communication with a neighboring base station placed adjacent to the base station to monitor whether or not a failure occurs in the neighboring base station;
- expanding coverage of the cell so as to complement coverage of a neighboring cell formed by the neighboring base station when it is detected as a result of the monitoring that the failure occurs in the neighboring base station;
- storing information on each of one or more neighboring base stations to be monitored, in association with information on coverage of each of neighboring cells formed by the each of one or more neighboring base stations;
- identifying, when it is detected that the failure occurs in one neighboring base station, information on coverage of one neighboring cell corresponding to said one neighboring base station; and
- determining a parameter for expanding the coverage of the cell based on the identified information.

4. The method according to claim 3, including:
- conducting the communication with the neighboring base station, by use of a signal defined in Ethernet OAM (Operations, Administration, Maintenance).

* * * * *